United States Patent
Liao et al.

(10) Patent No.: US 7,551,176 B2
(45) Date of Patent: Jun. 23, 2009

(54) SYSTEMS AND METHODS FOR PROVIDING SHARED ATTRIBUTE EVALUATION CIRCUITS IN A GRAPHICS PROCESSING UNIT

(75) Inventors: Fred Liao, San Jose, CA (US); John Brothers, Calistoga, CA (US)

(73) Assignee: Via Technologies, Inc., Taipei (TW)

( * ) Notice: Subject to any disclaimer, the term of this patent is extended or adjusted under 35 U.S.C. 154(b) by 411 days.

(21) Appl. No.: 11/466,861

(22) Filed: Aug. 24, 2006

(65) Prior Publication Data

US 2008/0049031 A1    Feb. 28, 2008

(51) Int. Cl.
G06F 1/00        (2006.01)
G06F 13/18    (2006.01)
G09G 5/36      (2006.01)
G09G 5/00      (2006.01)
G09G 5/02      (2006.01)

(52) U.S. Cl. .................. 345/581; 345/582; 345/558; 345/501; 345/535; 382/303; 382/304; 382/305

(58) Field of Classification Search .............. 345/418, 345/581–582, 587, 589, 619, 637, 501, 506, 345/535–538, 541, 545, 549, 552, 505, 522, 345/558, 606; 382/285, 300, 303–305; 711/145–147, 711/137–139
See application file for complete search history.

(56) References Cited

U.S. PATENT DOCUMENTS

| | | | |
|---|---|---|---|
| 6,226,012 B1 | 5/2001 | Priem et al. | |
| 6,466,222 B1 | 10/2002 | Kao et al. | |
| 2003/0184554 A1* | 10/2003 | Nakahara | 345/581 |
| 2003/0229620 A1* | 12/2003 | Carlson et al. | 707/2 |
| 2005/0024385 A1 | 2/2005 | Gruber | |
| 2005/0027683 A1* | 2/2005 | Dill et al. | 707/2 |
| 2006/0004989 A1* | 1/2006 | Golla | 712/214 |

* cited by examiner

Primary Examiner—Wesner Sajous
(74) Attorney, Agent, or Firm—Thomas, Kayden, Horstemeyer & Risley (57) ABSTRACT

Systems and method for providing shared attribute evaluation circuits in a graphics processing unit are provided. One embodiment can be described as a system for evaluating attributes in a graphics processing unit having a plurality of processing stages. The system can include an evaluation block, configured to process a plurality of attributes corresponding to a plurality of pixels and a plurality of FIFO buffers, each configured between one of the plurality of processing stages and the evaluation block. An embodiment can further include a shared buffer, configured to store the plurality of attributes or pointers during the attribute processing and processing priority logic, configured to determine a plurality of priorities corresponding to the plurality of attributes.

29 Claims, 10 Drawing Sheets

SYSTEMS AND METHODS FOR PROVIDING SHARED ATTRIBUTE EVALUATION CIRCUITS IN A GRAPHICS PROCESSING UNIT

TECHNICAL FIELD

The present disclosure is generally related to computer processing and, more particularly, is related to systems and methods for providing shared attribute evaluation circuits in a pixel rendering pipeline of a graphics processing unit.

BACKGROUND

As is known, the art and science of three-dimensional ("3-D") computer graphics concerns the generation, or rendering of two-dimensional ("2-D") images of 3-D objects for display or presentation onto a display device or monitor, such as a Cathode Ray Tube (CRT) or a Liquid Crystal Display (LCD). The object may be a simple geometry primitive such as a point, a line segment, a triangle, or a polygon. More complex objects can be rendered onto a display device by representing the objects with a series of connected planar polygons, such as, for example, by representing the objects as a series of connected planar triangles. All geometry primitives may eventually be described in terms of one vertex or a set of vertices, For example, a coordinate (X,Y, Z) that defines a point, can represent the endpoint of a line segment or a corner of a polygon.

To generate a data set for display as a 2-D projection representative of a 3-D primitive onto a computer monitor or other display device, the vertices of the primitive are processed through a series of operations, or processing stages in a graphics-rendering pipeline. A generic pipeline is merely a series of cascading processing units, or stages, wherein the output from a prior stage serves as the input for a subsequent stage. In the context of a graphics processor, these stages include, for example, per-vertex operations, primitive assembly operations, pixel operations, texture assembly operations, and rasterization operations.

Figure 1:
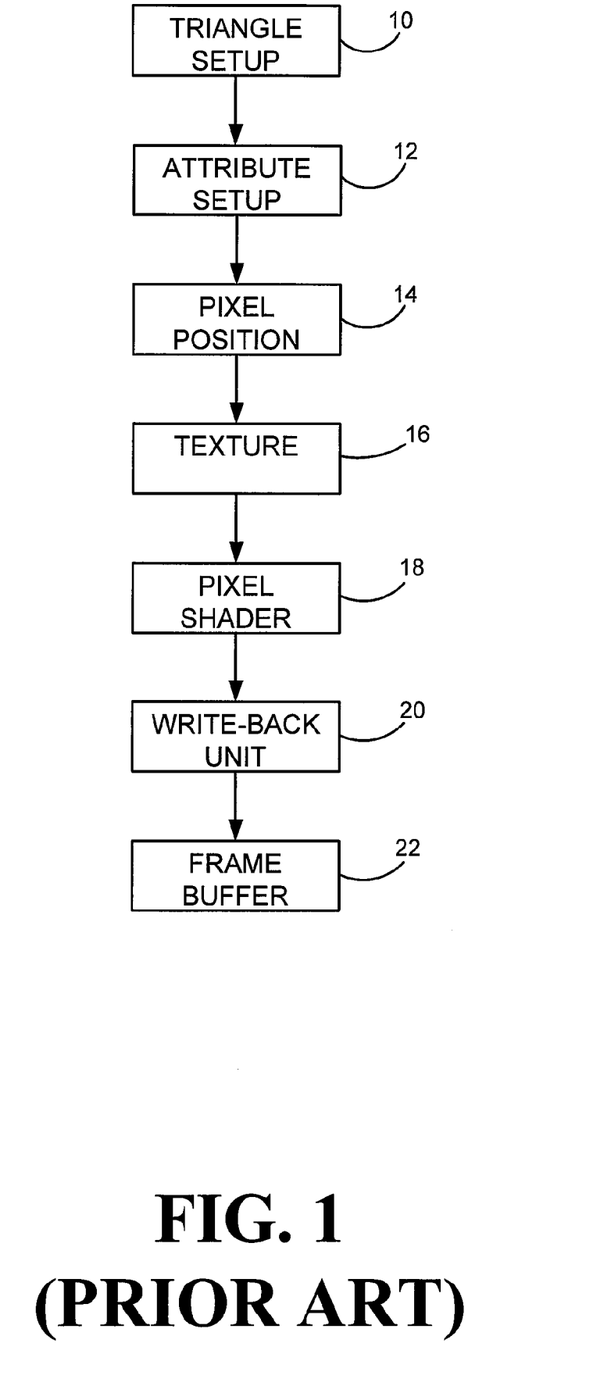
FIG. 1 illustrates a functional flow diagram of certain components within a graphics pipeline in a computer graphics system as known in the prior art.

Reference is now made to FIG. 1, which is a block diagram illustrating a generic pixel rendering pipeline as is known in the prior art. The pipeline includes a triangle setup stage 10 that is configured to generate data specific to a triangle geometry rasterization such as is used in a graphics pipeline. After the triangle data is determined, an attribute setup stage 12 generates the list of interpolation variables of known and required attributes to be determined in the subsequent stages of the pipeline. The pixel position stage 14 evaluates position specific attributes for particular pixels in the triangle and the texture stage 16 processes the texture specific attributes for pixels in the triangle. While the texture stage 16 may utilize any number of techniques for determining texture values, once the texture values have been determined for any pixel, all of the attributes such as the color components, the texture value, fog, and the spectral color components are combined in the pixel shader 18 to produce a resulting color for that pixel in the graphics pipeline. The processed data proceeds to the write-back unit 20 and then is ultimately stored in the frame buffer 22.

Several of the aforementioned pipeline stages require attribute evaluation using, for example, linear interpolation techniques, among others. The manipulations by which these attributes are evaluated are quite complicated since they require evaluating attributes with respect to one another. One of ordinary skill in the art will appreciate that the process for evaluating the final color values for each pixel in the graphics pipeline might be complicated and time consuming. One way to accelerate the process is to produce a number of pixels in parallel. This approach, however, requires that each pixel produced in parallel have its own circuitry for evaluating the combination of attributes. This additional circuitry, while improving performance, can be expensive in terms of complication, size, and expense. Other techniques for accelerating the evaluation is to process pixels in groups having common attribute characteristics. This approach, however, may be susceptible to varying levels of performance improvements based on the nature of the displayed image and the relatedness of the pixel data within a triangle or other primitive.

Thus, a heretofore-unaddressed need exists in the industry to address the aforementioned deficiencies and inadequacies.

SUMMARY

Systems and method for providing shared attribute evaluation circuits in a graphics processing unit are provided. One embodiment can be described as a system for evaluating pixel attributes in a graphics processing unit having a plurality of processing stages, comprising: an evaluation block, configured to process a plurality of attributes corresponding to a plurality of pixels; a plurality of FIFO buffers, each configured between one of the plurality of processing stages and the evaluation block; a shared buffer, configured to store the plurality of attributes during the attribute processing; and processing priority logic, configured to determine a plurality of priorities corresponding to the plurality of attributes.

Embodiments of the present disclosure can also be viewed as providing systems for evaluating attributes in a graphics processing unit. In this regard, one embodiment of such a system, among others, can be broadly summarized as: triangle attribute setup logic, configured to determine triangle data in a graphics pipeline; attribute setup logic, configured to determine a plurality of attributes corresponding to the triangle data; central buffering logic, configured to store the plurality of attributes during processing; calculation logic, configured to evaluate attributes from each of a plurality of processing stages; and arbitration logic, configured to establish priorities for the calculation logic.

Embodiments of the present disclosure can also be viewed as providing methods for evaluating attributes in a graphics processing unit. In this regard, one embodiment of such a method, among others, can be broadly summarized by the following: selecting a plurality of pixels, each pixel having a plurality of attributes; dividing the plurality of graphics attributes into a plurality of groups, the plurality of groups corresponding to a plurality of stages in the graphics processing unit; assigning a plurality of processing priorities corresponding to the plurality of groups; receiving a plurality of attributes into an evaluation block; and evaluating the plurality of attributes based on the plurality of priorities.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Figure 2A:
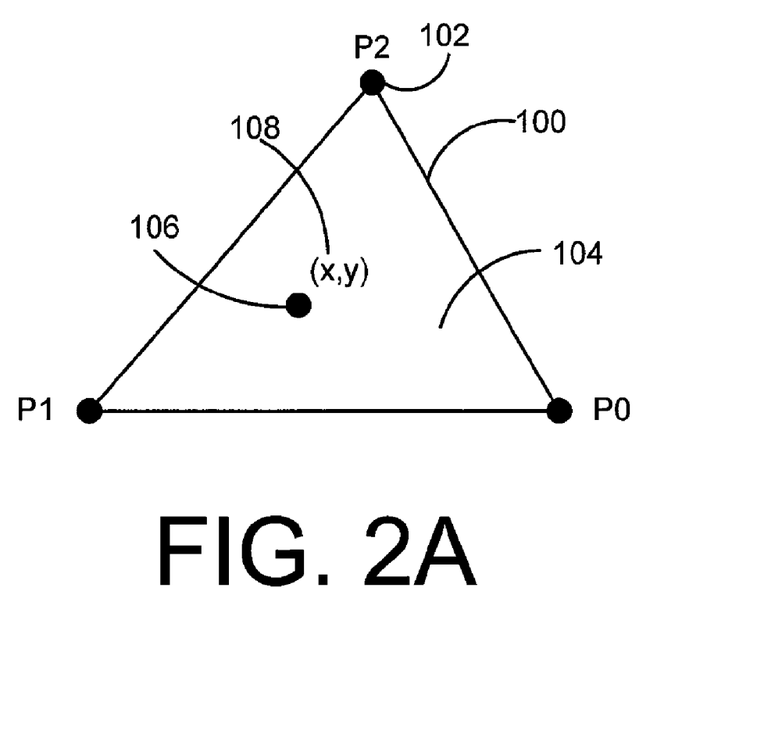
FIGS. 2A and 2B illustrate Cartesian and Barycentric techniques for pixel evaluation within a triangle as generated within a graphics processing unit.
Figure 2B:
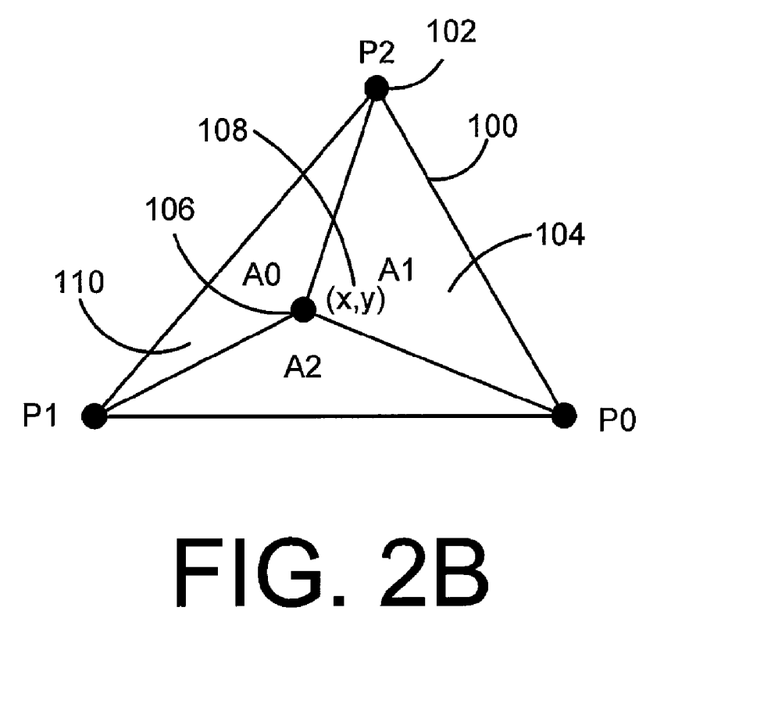

Reference is made to FIGS. 2A and 2B, which illustrate, respectively, Cartesian and Barycentric techniques for pixel evaluation within a triangle generated in a graphics processing unit. The triangle 100 is defined by the locations of three vertices 102 and has an area 104. Each of the vertices 102 can be defined by location coordinates and one or more additional attributes including, but not limited to, texture and color among others. Within the triangle 100 a pixel 106 includes a specific location defined by coordinates 108. Evaluating an attribute value for the pixel 106 in a Cartesian setup scheme involves utilizing the X and Y location coordinates of the vertices in combination with the attribute values of the vertices to determine an attribute value for the pixel 106. The general equation for determining the pixel attribute value is:

$$P(x,y) = P_x \bullet x + P_y \bullet y + P_c$$

where $P_x$, $P_y$ and $P_c$ are triangle setup parameters per attribute and x and y are the coordinates 108 of pixel 106.

Referring to FIG. 2B, the Barycentric setup scheme utilizes fractional areas 110 that are defined by the pixel 106 and each unique pair of the vertices 102. For example, fractional area A0 is defined by the three points P1, P2, and the pixel 106. Similarly, fractional area A1 is defined by the points P0, P2, and the pixel 106. For purposes of attribute weight determination the fractional area corresponding to the attribute value of vertex P0 is the fractional area A0. As a pixel location moves further from a specific vertex, the corresponding fractional area decreases in size. The pixel attribute will be evaluated by the equation:

$$P(x,y) = \frac{A0}{A}(x,y) \cdot P0 + \frac{A1}{A}(x,y) \cdot P1 + \frac{A2}{A}(x,y) \cdot P2$$

where the P0, P1, and P2 are vertex attribute values, A0, A1, and A2 are the three fractional areas that are divided by the pixel at (X,Y) within the triangle, and A is the total area of the triangle defined by P0, P1, and P2. In this manner, the vertex attribute values are each multiplied by a corresponding ratios of the fractional areas. The ratios of fractional areas are referred to as Barycentric coordinates, $\alpha$, $\beta$, and $\gamma$. The Cartesian setup and the Barycentric setup schemes are provided as non-limiting examples of techniques for determining pixel attributes and can each be utilized exclusively or non-exclusively in practicing the systems and methods disclosed herein. Further, the systems and methods disclosed herein can be utilized in systems using other numeric techniques for performing the calculations.

Figure 3:
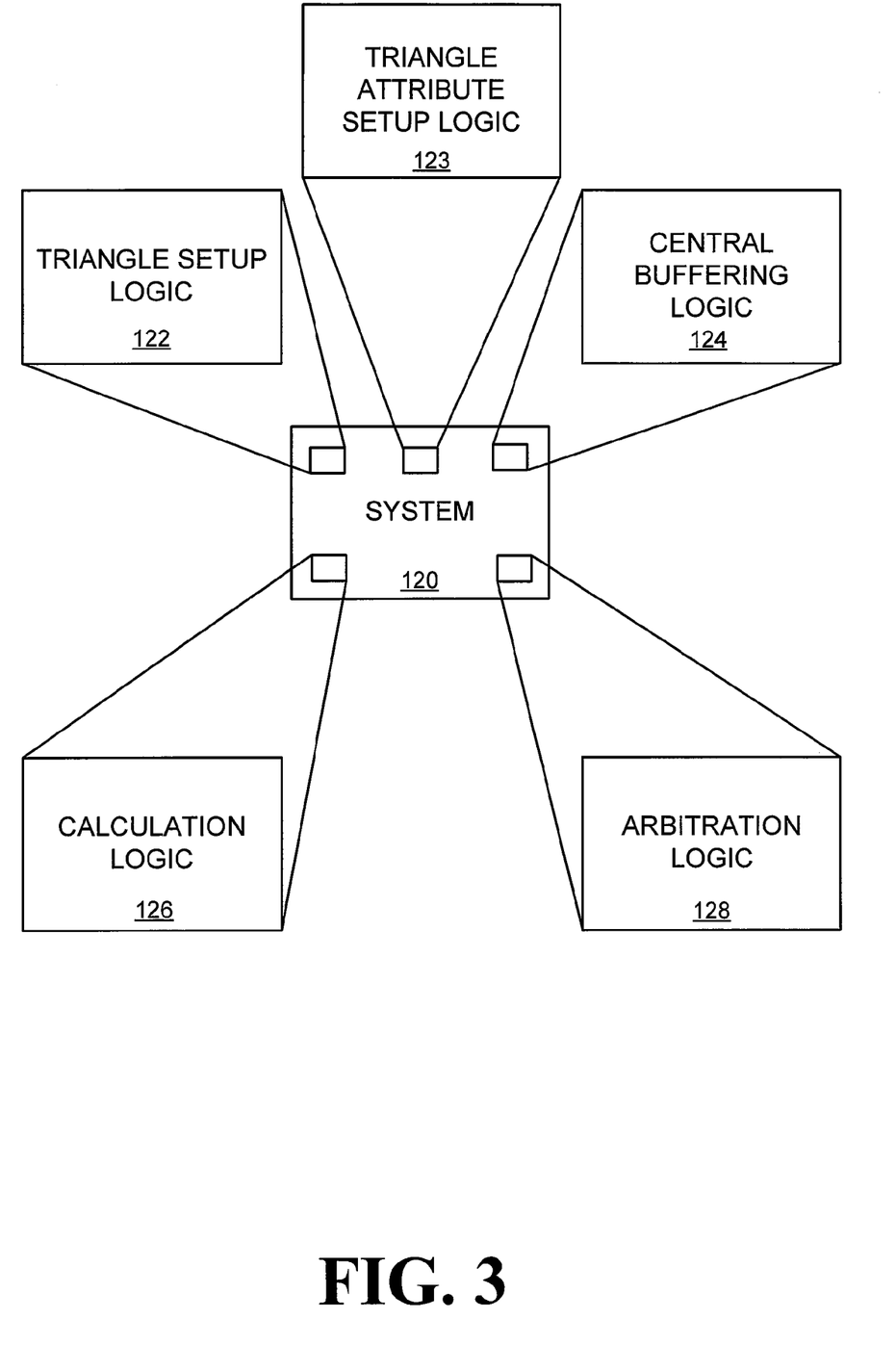
FIG. 3 is a block diagram illustrating an embodiment of a system for evaluating attributes in a graphics processing unit.

Reference is now made to FIG. 3 which is a block diagram illustrating an embodiment of a system for evaluating attributes in a graphics processing unit. The system 120 includes triangle setup logic 122 that is configured to determine triangle coordinate data for the triangles used to render a scene in a computer graphics environment. The system also includes triangle attribute setup logic 123, which is configured to determine attributes for each of the pixels within a triangle defined by the triangle setup logic. The system 120 further includes central buffering logic 124, which is configured to store attribute setup data for triangle pixels as they progress through multiple processing stages in a graphics pipeline. In this regard, the central buffering logic 124 can be configured to utilize address pointers such that the actual attribute data is not required to move as the particular triangle pixel processing proceeds through the multiple stages in the graphics pipeline. Since the performance cost for relaying pointers is small relative to moving the actual attribute data, the long latency associated with GPU attribute processing results in significant improvements in performance and memory utilization efficiency.

The system 120 further includes calculation logic 126, which is configured to evaluate attributes for pixels as required in each of the processing stages within the graphics pipeline. The calculation logic 126 can be included in evaluation blocks or evaluation circuits and, under the systems and methods disclosed herein, can be shared by the multiple processing stages in the graphics pipeline. As multiple evaluation requests are generated by the multiple processing stages in the pipeline, arbitration logic 128 is configured to establish priorities for the calculation logic. By establishing priorities for the calculation logic, the arbitration logic 128 serves to promote the efficient use of the calculation logic by the multiple processing stages in the graphics pipeline. In this manner the calculation logic is shared by each of the multiple processing stages in the graphics pipeline. The system can further include FIFO buffering logic for storing attributes between each of the multiple processing stages and the calculation logic 126.

Figure 4:
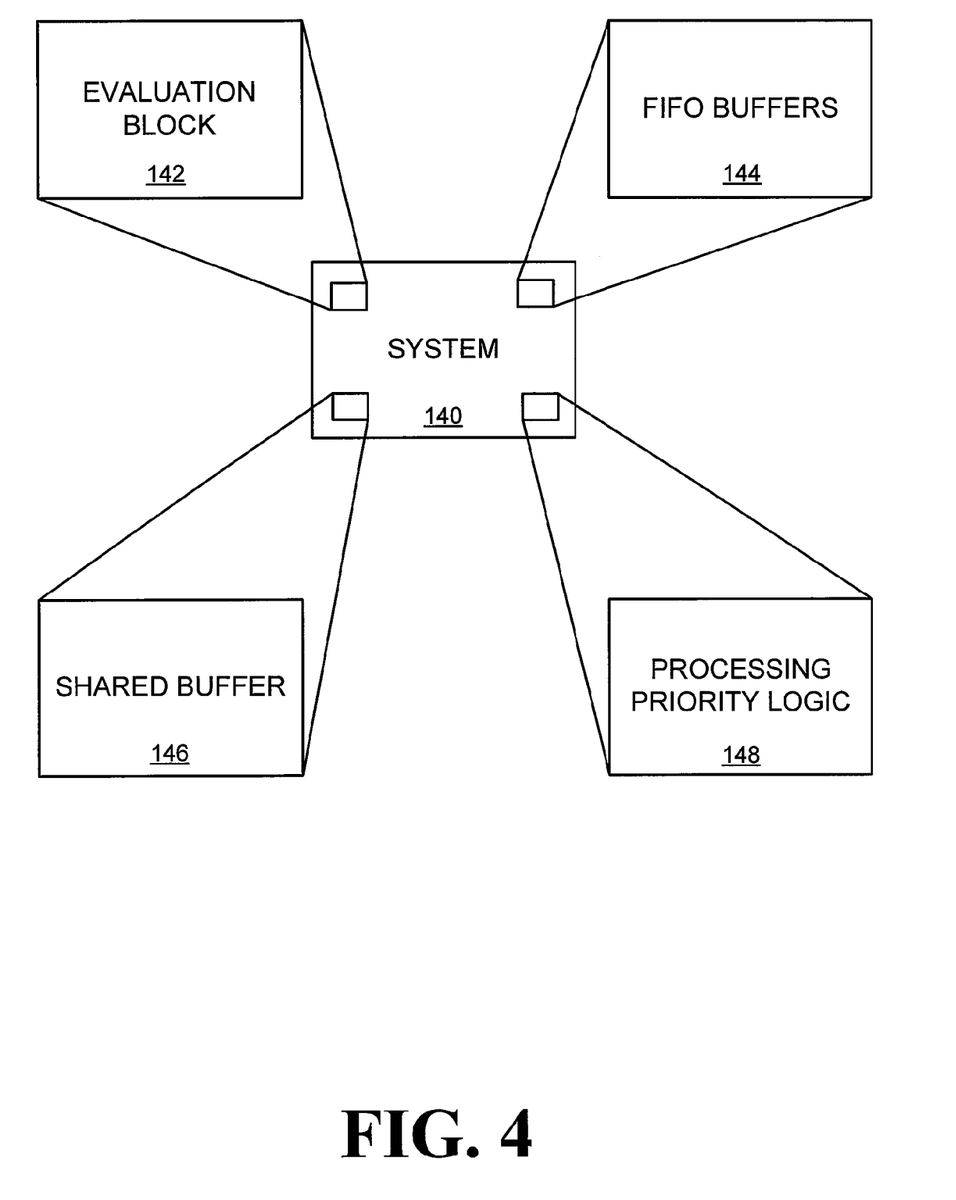
FIG. 4 is a block diagram illustrating an alternative embodiment of a system for evaluating attributes in a graphics processing unit.

Reference is now made to FIG. 4, which is a block diagram illustrating an alternative embodiment of a system for evaluating attributes in the graphics processing unit. The system 140 includes an evaluation block 142, which is configured to process multiple attributes corresponding to pixels that are being processed in the multiple stages of the graphics pipeline. The evaluation block 142 can be used to calculate an attribute for a pixel where the pixel lies within a triangle having vertices with known attribute values. While some embodiments include the utilization of triangles as primitives, the utilization of primitives of other formats including lines, points, and other polygons, is contemplated within the scope and spirit of the claims. The shared evaluation block 142 can include multiple evaluation circuits configured to support parallel pixel processing. The system 140 also includes first-in-first-out (FIFO) buffers 144 configured to buffer data received by and sent by the multiple processing stages in the graphics pipeline.

The system 140 also includes a shared buffer 146, which can be utilized to store triangle attribute setup data corresponding to pixels being processed in any one of the multiple processing stages in the graphics pipeline. Triangle attribute setup data in the shared buffer 146 can be circulated through the different processing stages of the graphics pipeline using pointers, which include a buffer address, and a pointer-type which communicates the type of attribute being stored in the buffer. Pointers can be relayed to different processing stages in the graphics pipeline without moving the triangle attribute setup data within the shared buffer 146. The system 140 also includes processing priority logic 148, which is configured to determine priorities for processing or evaluating attributes in the multiple processing stages of the graphics pipeline. In this manner, the evaluation block 142 provides evaluation logic for each of the multiple processing stages in the graphics pipeline in an efficient order as determined by the processing priority logic 148. The processing priority logic 148 can utilize information relating to the type of attribute and/or the status of other pipeline components to determine which evaluation requests from the multiple processing stages are given the highest priority. In some embodiments, the processing priority logic 148 can be programmable by a driver for maximum flexibility and configurability.

Figure 5:
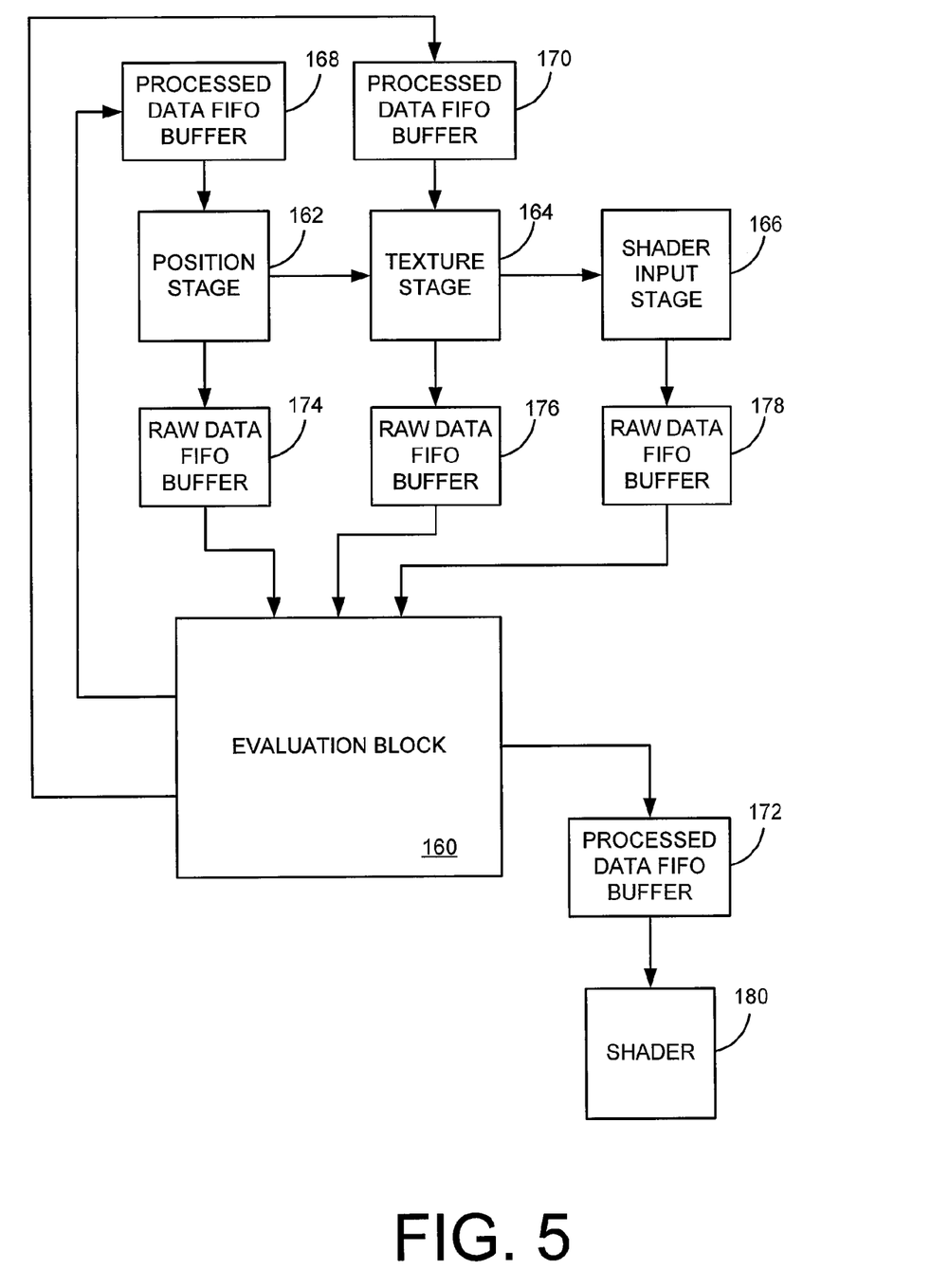
FIG. 5 is a block diagram illustrating an exemplary data flow in an embodiment of a system for evaluating attributes in a graphics processing unit.

Reference is now made to FIG. 5, which is a block diagram illustrating an exemplary data flow in the embodiment of a system for evaluating attributes in a graphics processing unit. There are three main clients for evaluation circuits. Those clients include, but are not limited to, the position stage 162, the texture stage 164, and the shader input stage 166, which may require pixel interpolation. The graphics processing unit includes a position stage 162 for processing position attributes that determine information such as pixel location and visibility. Examples of attributes processed at this stage include, but are not limited to, pixel X, pixel Y, pixel Z, pixel W, and stencil values. The exemplary graphics processing unit also includes a texture stage 164, which is configured to process attributes that determine the pixel texture mapping colors. Attributes corresponding to the position stage 162 and the texture stage 164 are evaluated at different times such that the position stage 162 attributes are evaluated at a time before the texture stage 164 attributes are evaluated for a given pixel.

The exemplary graphics processing unit also includes a shader input stage 166 that is utilized to evaluate attributes like diffuse and specular color, surface normal, and fog, among others, that are passed to the pixel shader for the more complex processing along with texture mapping color data. Each of the processing stages 162, 164, 166 requires attributes to be evaluated by the evaluation block 160. Each of the processing stages includes a corresponding output FIFO buffer 174, 176, 178 configured to store the raw data from the processing stages until the evaluation circuit 160 is available to perform the evaluation on that data. Each of the FIFO's 174, 176, 178 is arranged between a corresponding stage and the evaluation block 160. Raw data can be, for example, blank pixel data with corresponding pointers that point to relevant triangle attribute setup values in the shared buffer 146. The data generally moves downstream from the position stage 162 to the texture stage 164, the shader input stage 166 and through the evaluation circuit 160 to the shader 180. After evaluating position data, the evaluation circuit 160 sends the processed attribute data to a processed data FIFO buffer 168, which stores the processed data until the position stage 162 is available to receive the processed data and forward it to a subsequent processing stage, such as the texture stage 164. In some cases, the processed position stage data will not proceed to the texture stage 164 because, the evaluation result indicates that the result is no longer relevant. For example, data is no longer relevant if a depth test determines that the pixels will not be visible. In other cases, for example, the processed position stage data will proceed from the position stage 162 to the texture stage 164.

The texture stage 164 sends raw data to a raw data FIFO buffer 176 for subsequent processing in the evaluation circuit 160. The corresponding processed data is sent to the processed data FIFO buffer 170 for storage until the texture stage 164 is available to receive the processed data. Some of the processed data may then be forwarded to the shader input stage 166. Raw data from the shader input stage 166 is stored in the raw data FIFO buffer 178 until the evaluation circuit 160 is available to evaluate the raw data. After the shader input stage data is evaluated in the evaluation circuit 160 the processed shader attributes are transmitted to the processed data FIFO buffer 172 for storage until the shader 180 is available for subsequent processing. The shader 180 can be configured to receive processed data from the evaluation circuit 160 corresponding to any or all of the position stage 162, the texture stage 164 and the shader input stage 166 through separate data paths or following the stages of the pipeline.

Figure 6:
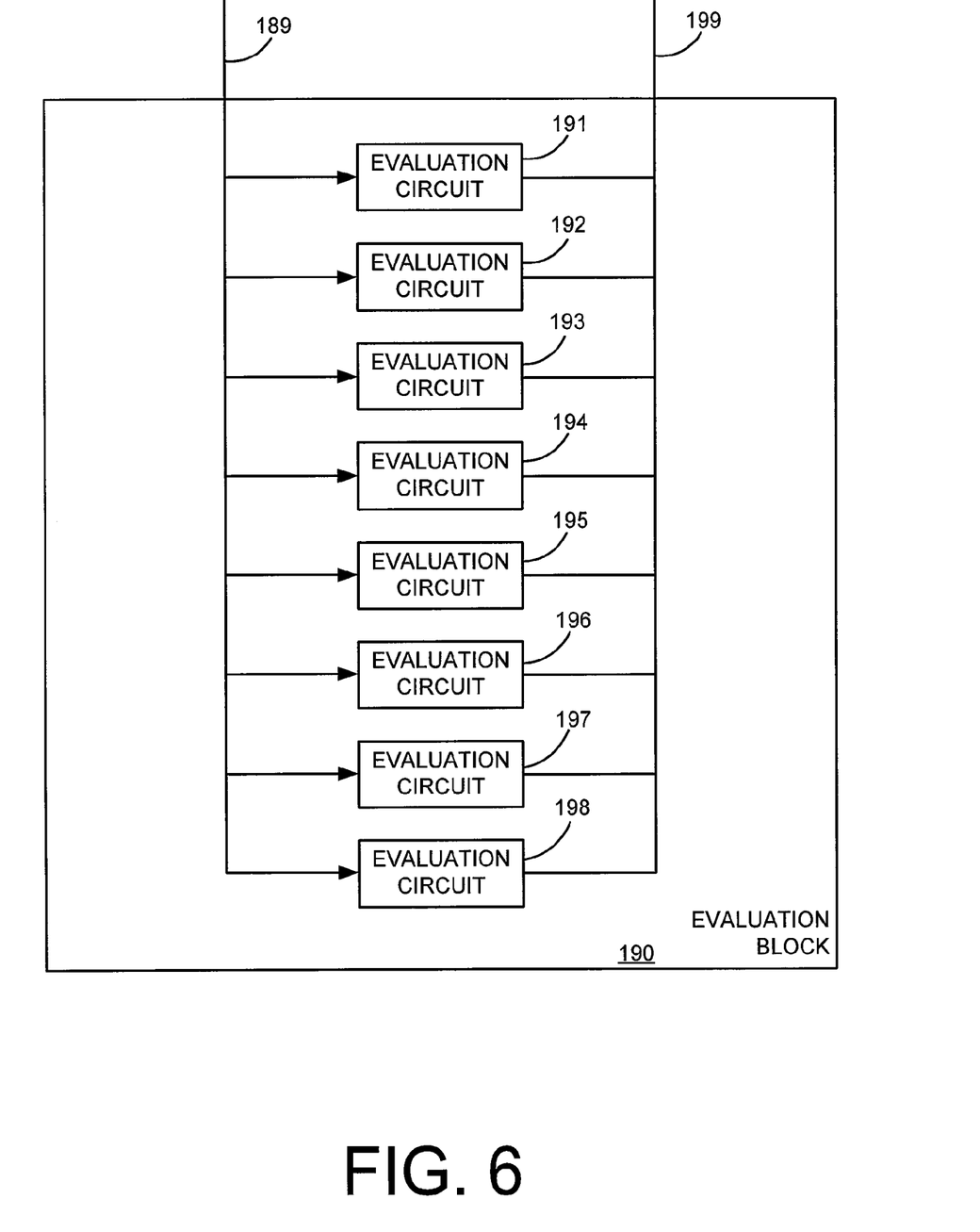
FIG. 6 is a block diagram illustrating an exemplary embodiment of an evaluation block as utilized in a parallel processing scheme.

Brief reference is made to FIG. 6, which is a block diagram illustrating an exemplary embodiment of an evaluation block as utilized in a parallel processing scheme. An evaluation block 190 is configured to receive raw data 189 corresponding to a variety of attributes from the multiple processing stages in the graphics pipeline. An evaluation block 190 can include multiple evaluation circuits 191 through 198 configured to simultaneously perform attribute evaluations for multiple pixels in parallel. For example, eight pixels can be divided into two independent groups of four pixels for parallel evaluations. As the evaluations are completed by the evaluation circuits 191 through 198, processed attribute data 199 is sent to a FIFO buffer that corresponds to the particular processing stage within the graphics pipeline.

Figure 7:
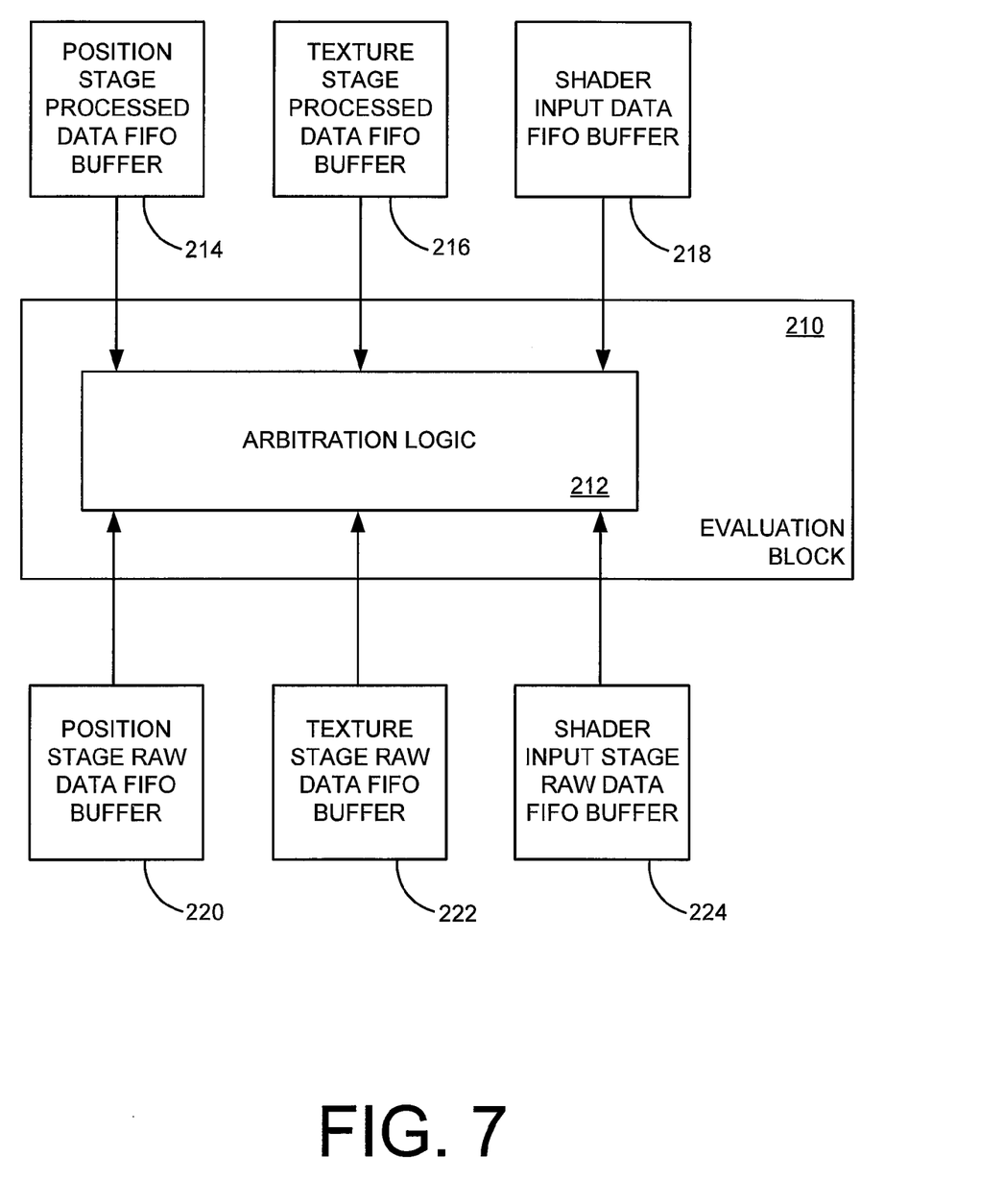
FIG. 7 is a block diagram illustrating an exemplary embodiment of an evaluation block having arbitration logic.

Reference is now made to FIG. 7, which is a block diagram illustrating an exemplary embodiment of an evaluation block having arbitration logic. The evaluation block 210 is utilized to determine attribute values for pixels located, for example, within a primitive as rendered in a graphics processing unit. The evaluation block 210 receives evaluation requests from multiple processing stages within the graphics pipeline and utilizes arbitration logic 212 to establish processing priorities for the evaluation requests. The arbitration logic 212 can receive utilization data from the plurality of FIFO buffers associated with the multiple stages in the graphics pipeline. For example, a position stage in the graphics pipeline can include a processed data FIFO buffer 214 and a raw data FIFO buffer 220. The position stage raw data FIFO buffer 220 is utilized to store the blank pixel data and pointers to attribute setup values in a shared buffer, associated with an evaluation request sent from the position processing stage to the evaluation block. The position stage processed data FIFO buffer 214 is utilized to store pixel attribute data after the evaluation has been performed in the evaluation block 210. Similarly, the texture stage also has corresponding processed and raw data FIFO buffers 216, 222. The arbitration logic 212 also receives utilization data corresponding to the shader input stage raw data FIFO buffer 224, which is utilized to store data between the shader input stage and the evaluation block 210. After the raw data is processed, the evaluated attributes are sent to the shader input data FIFO buffer 218 for subsequent use by the shader (not shown). By receiving data corresponding to the utilization levels of the multiple FIFO buffers, the arbitration logic 212 can determine processing priorities for the evaluation requests based on the number of currently used entries. For example, a high priority might be given to an evaluation request from the position stage where the position stage raw data FIFO buffer 220 exceeds a predetermined threshold of utilization. In this example the high priority afforded the position stage evaluation request would serve to reduce the risk of a stall at this stage in the pipeline. In contrast, where the position stage processed data FIFO buffer 214 exceeds the predetermined threshold of utilization the arbitration logic 212 may establish a lower priority for subsequent position stage evaluation requests. By receiving utilization data from the FIFO buffers corresponding to each of the multiple processing stages in the pipeline, the arbitration logic 212 establishes priorities for evaluation requests in a manner that reduces the risk of a stall at any given stage of the graphics pipeline.

Figure 8:
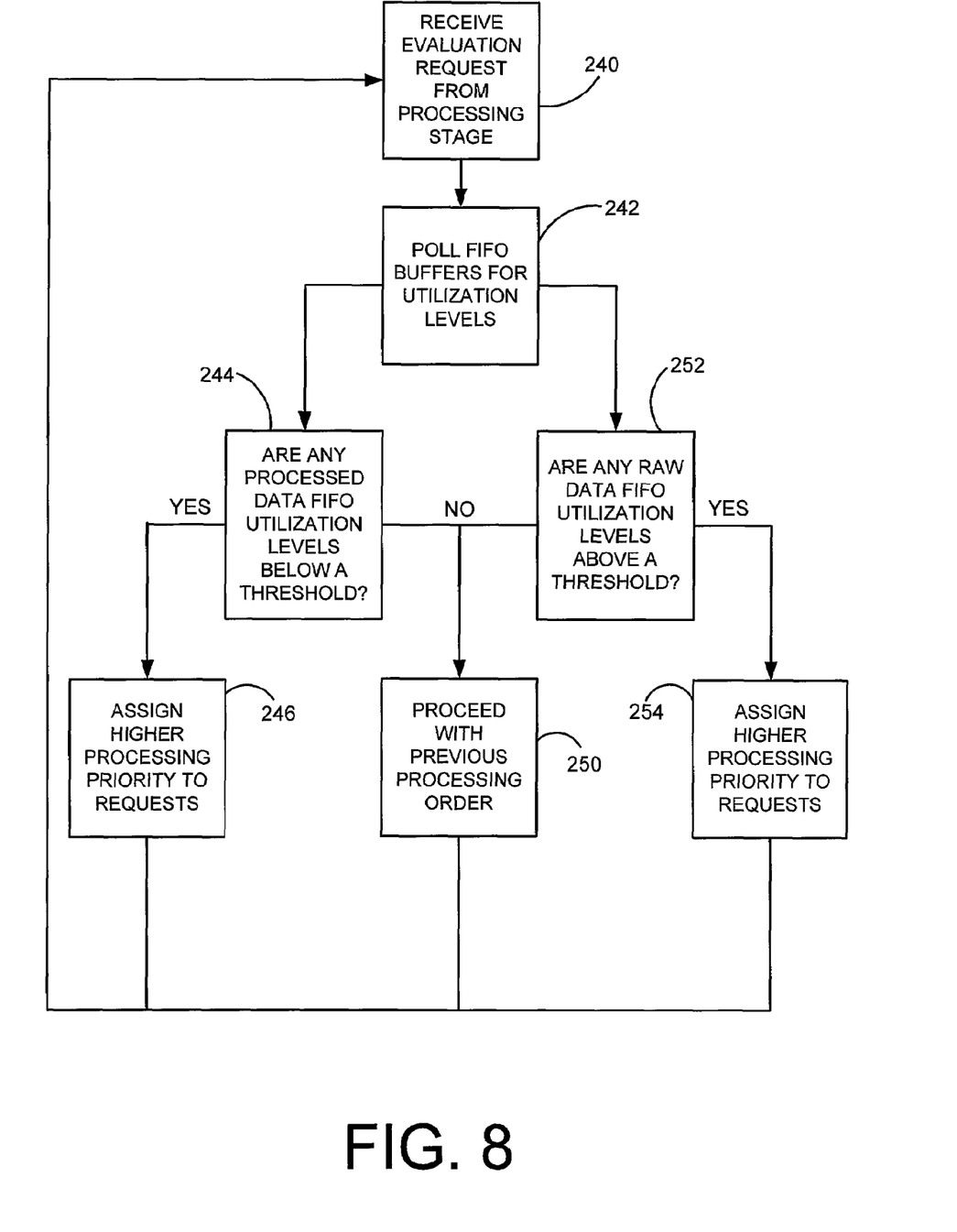
FIG. 8 is a block diagram illustrating an exemplary embodiment of arbitration logic.

Reference is now made to FIG. 8, which is a block diagram illustrating an exemplary embodiment of arbitration logic. The arbitration logic receives an evaluation request from a processing stage in the graphics pipeline in block 240. The FIFO buffers corresponding to the multiple processing stages are polled to determine their utilization levels in block 242. The arbitration logic then determines if there are any process data FIFO utilization levels below a specific threshold in block 244. If there are process data FIFO utilization levels below the threshold then the corresponding processing stage may be at risk of experiencing a stall while waiting for evaluated attribute data. In this case a higher processing priority is assigned to an evaluation request corresponding to that stage in block 246. Where the process data FIFO utilization levels are above a predetermined threshold, the previously established processing order is continued in block 250. Where the arbitration logic determines that a raw data FIFO buffer utilization level exceeds a specific threshold in block 252, a higher processing priority is assigned to evaluation requests from the stage corresponding to that FIFO buffer in block 254. Where none of the raw data FIFO buffer utilization levels exceed a specific threshold the arbitration logic proceeds with the previous processing priority order in block 250. This arbitration logic continually operates as additional evaluation requests are received from the multiple processing stages in the graphics pipeline. Where the arbitration logic has failed to assign specific processing priorities to the evaluation requests, a default processing order can be implemented using, for example, a round robin approach where the evaluation requests are processed based on a predetermined order that corresponds to, for example, each of the multiple processing stages.

Figure 9:
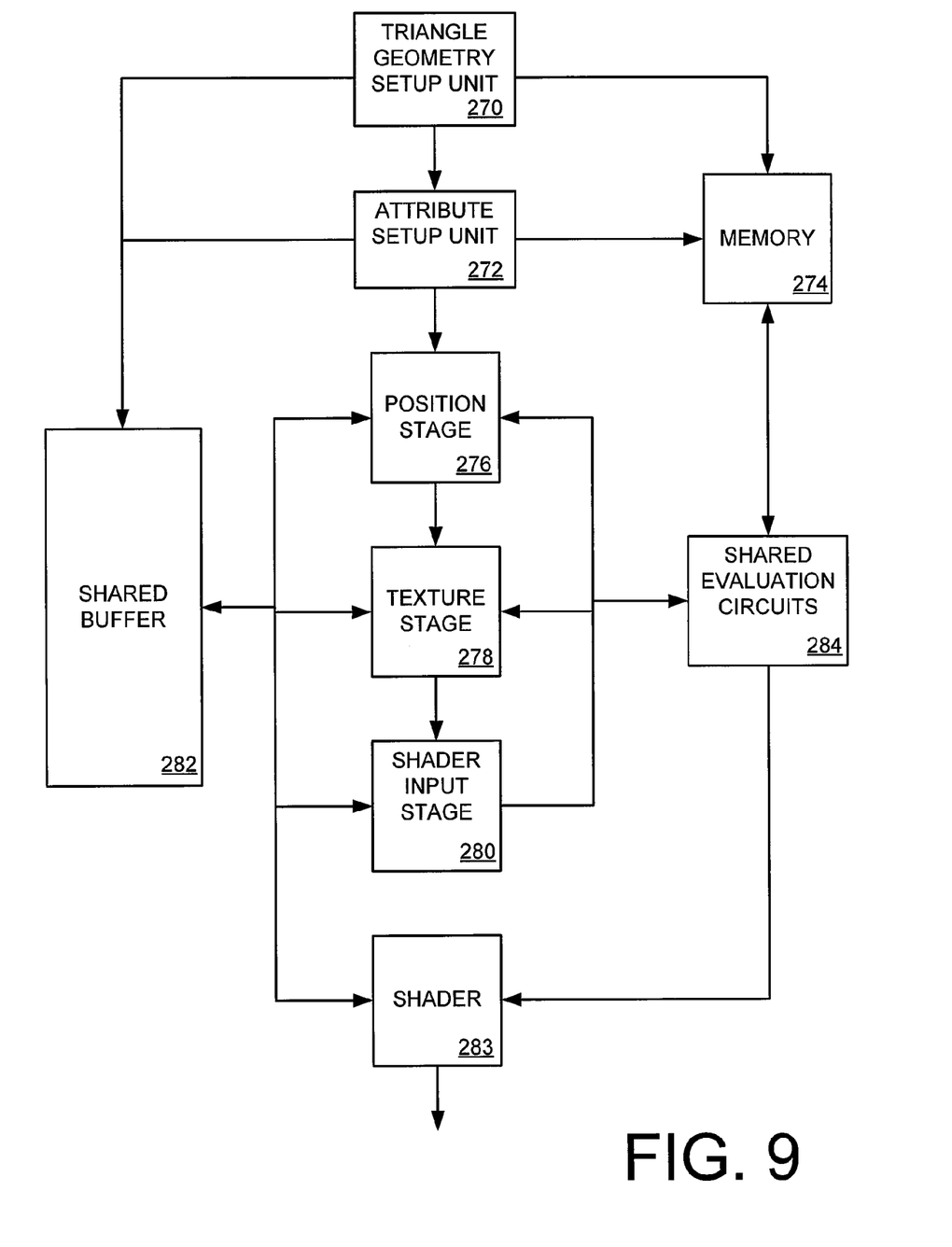
FIG. 9 is a block diagram illustrating an exemplary embodiment of a shared buffer utilized in conjunction with a system for evaluating attributes in a graphics processing unit.

Reference is now made to FIG. 9, which is a block diagram illustrating an exemplary embodiment of a shared buffer utilized in conjunction with a system for evaluating attributes in a graphics processing unit. The system includes a triangle geometry setup unit 270, which is configured to establish the coordinate data that is utilized to define the triangles used in the rendering process.

Alternative embodiments can store the triangle attribute setup data in the shared buffer 282. Pointers corresponding to the stored triangle attribute setup data can be passed through the multiple pipeline stages with the raw triangle data. When one of the pipeline stages receives a pointer, the pointer is sent to the shared evaluation circuits 284, which retrieve the triangle attribute setup data from the shared buffer 282. In this manner, the shared buffer 282 can be used independent of the memory 274.

In some embodiments, the triangle geometry setup data is stored in the memory 274 and sent to the attribute setup unit 272, which calculates the attribute setup data for the triangle. A pointer to the memory location of the triangle attribute setup data is transmitted to the shared buffer 282 for storage while the corresponding triangles are being processed in the graphics pipeline. By way of example, a pixel can have 32 or more attributes where each attribute can include four or more individual components. The triangle attribute setup data is sent to the memory 274 and pointers corresponding to the attribute setup data are sent to the shared buffer 282. Also stored in the shared buffer 282 is a pointer type for each of the pointers, where the pointer type identifies an attribute group associated with the specific triangle. Since the attribute evaluation process requires a significant number of cycles before it reaches the pixel shader as an input, the large amount of corresponding data is managed by using the shared buffer to store the setup results in conjunction with pointers that refer to particular attribute components. Portions of the buffer can be allocated by the triangle setup unit and the attribute setup unit and de-allocated by any subsequent processing stage that has consumed the corresponding data. For example, if the position stage 276 determines that a pixel in the triangle is no longer visible, the attribute setup data corresponding to that triangle can be de-allocated within the shared buffer.

The pipeline has multiple processing stages including the position stage 276, a texture stage 278, a shader input stage 280, and the shared buffer 282. As the different pixel attributes are processed through the pipeline the relevant data progresses from one stage to another. For example, the attributes in the position stage 276 utilize the pointers and pointer types retrieved from the shared buffer 282 to send the appropriate attribute setup values to the shared evaluation circuits 284 for attribute evaluation. After those attributes have been evaluated by the shared evaluation circuits 284, the processed data is returned to the position stage 276. In cases where those attributes require no further processing the position stage de-allocates the corresponding pointer data in the shared buffer 282. Alternatively, the attributes may be utilized in subsequent stages such as the texture stage 278, which similarly accesses the shared buffer for the pointer and pointer-type information corresponding to the attribute setup values and sends the raw data for evaluation to the shared evaluation circuits 284. Note that attributes that have been evaluated by the shared evaluation circuits 284 as requested by the shader input stage 280 are sent to the shader 283. The attribute data sent to the shared evaluation circuit 284 by the processing stages 276, 278 and 280 consists of pointers and pointer-types corresponding to the shared buffer 282. The shared evaluation circuit 284 utilizes the pointers to access the actual attribute setup data values stored in the memory 274. The shared evaluation circuit 284 utilizes the pointer type to assess a processing priority as between types of attributes. For example, attributes in the position group would generally be processed at a time before attributes in the texture group. Similarly, attributes in the texture group would generally be processed at a time before attributes in the shader group. In this manner, only the pointers and the pointer-types are relayed around the graphics pipeline, thus avoiding passing a large amount of data associated with the numerous triangle attributes being processed.

Figure 10:
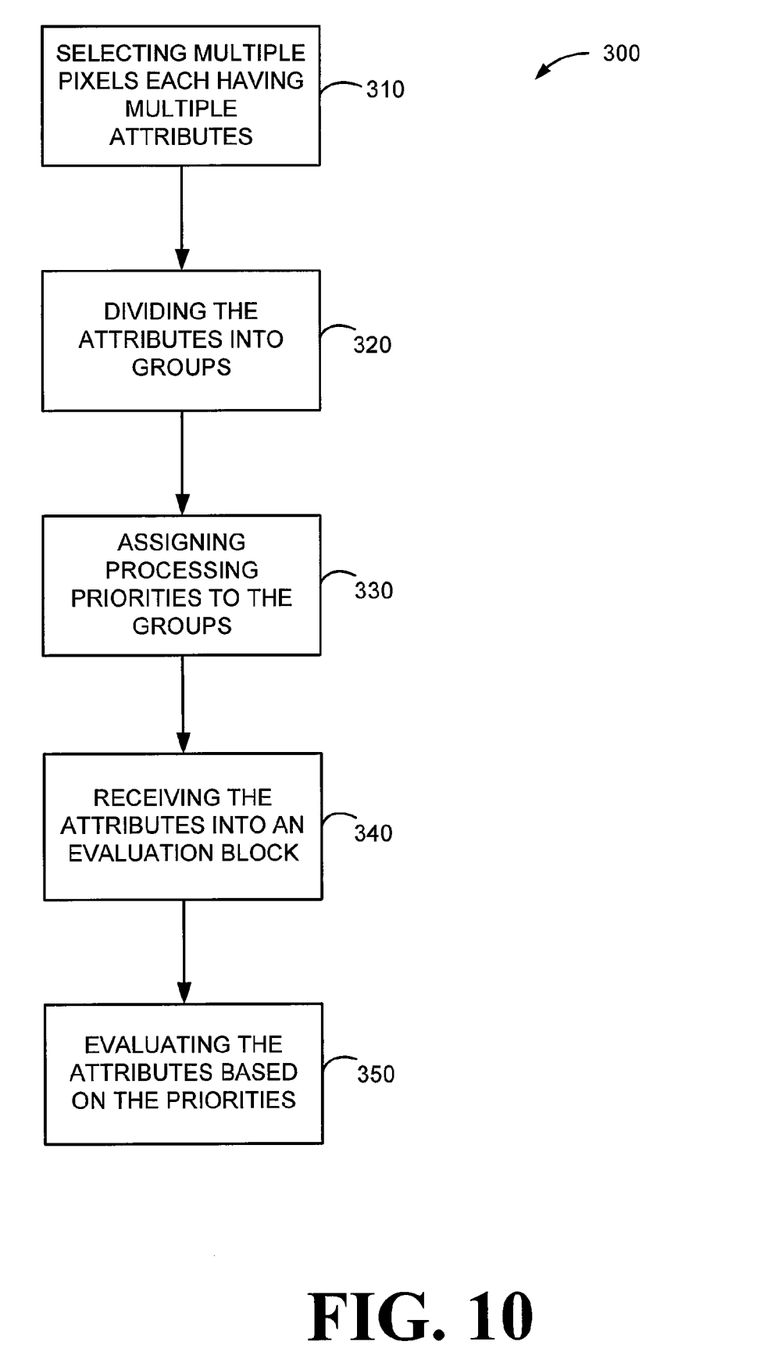
FIG. 10 is a block diagram illustrating an exemplary embodiment of a method for evaluating attributes in a graphics processing unit.

Reference is now made to FIG. 10, which is a block diagram illustrating an exemplary embodiment of a method for evaluating attributes in a graphics processing unit. The method begins with selecting multiple pixels within a triangle where each pixel has multiple attributes in block 310. By way of example, there can be 32 or more attributes per pixel where each attribute can include four or more components. The pixel selected will generally be contained within the same primitive, or triangle in some embodiments. The attributes are divided into groups in block 320 where the group can correspond to, for example, the different processing stages within a graphics pipeline. For example, a position group can include attributes that determine pixel location and visibility including, but not limited to, pixel X, pixel Y, pixel Z, pixel W and stencil values. Similarly, the texture group can include attributes that determine pixel texture mapping colors. A color group can include those attributes that are passed to a pixel shader directly for complex color operations including, but not limited to, diffuse color, fog, and normal surface functions among others.

Processing priorities are assigned to each of the groups of attributes in block 330. For example, the attributes in different groups will be evaluated at different times for performance reasons even in the circumstance where all are required to perform the pixel shader operations. The processing priorities may generally provide that, for example, position group attributes are processed in advance of texture group attributes and texture group attributes are processed in advance of color group attributes. The attributes are received into an evaluation block, in block 340 from the multiple processing stages in the graphic pipeline. In block 350 the attributes are evaluated based on the general priorities assigned in block 330. As discussed above in reference to FIGS. 7 and 8, additional arbitration logic can be utilized to further refine the processing priorities and to increase the processing efficiency and performance of the pipeline.

Embodiments of the present disclosure can be implemented in hardware, software, firmware, or a combination thereof. Some embodiments can be implemented in software or firmware that is stored in a memory and that is executed by a suitable instruction execution system. If implemented in hardware, an alternative embodiment can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of an embodiment of the present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure, particularly, any illustrated embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

The invention claimed is:

1. A method for evaluating attributes in a graphics processing unit, comprising:
   selecting a plurality of pixels, each pixel having a plurality of attributes;
   dividing the plurality of attributes corresponding to all of the plurality of pixels into a plurality of groups, the plurality of groups corresponding to a plurality of stages in the graphics processing unit, and wherein the dividing an operation selected from the group consisting of:
   (1) defining a texture group, configured to include attributes that determine pixel texture mapping data, and
   (2) defining a color group, configured to include attributes that are utilized to perform shader operations;
   assigning a processing priority to each of the plurality of groups;
   receiving the plurality of attributes into an evaluation block; and
   evaluating the plurality of attributes in an order determined by comparing the processing priority of one of the plurality of groups with the processing priority of another of the plurality of groups.

2. The method of claim 1, further comprising storing the plurality of attributes in a shared buffer.

3. The method of claim 2, further comprising advancing the plurality of attributes through the plurality of stages within the evaluation block.

4. The method of claim 3, wherein the advancing comprises utilizing a plurality of pointer addresses, configured to point to the plurality of attributes in the shared buffer.

5. The method of claim 1, wherein the dividing comprises defining a position group, configured to include attributes that determine pixel location.

6. The method of claim 5, wherein the position group comprises attributes selected from the group consisting of: a pixel X position, a pixel Y position, a pixel Z position, a pixel W position, and a pixel stencil value.

7. The method of claim 1, wherein the evaluating comprises arbitrating a plurality of evaluation requests from the plurality of stages.

8. The method of claim 7, wherein the arbitrating comprises determining a plurality of utilization levels corresponding to a plurality of FIFO's arranged between each of the plurality of stages and the evaluation block.

9. The method of claim 1, wherein a first processing priority is assigned to attributes in a position group.

10. The method of claim 9, wherein a second processing priority is assigned to attributes in a texture group.

11. The method of claim 10, wherein a third processing priority is assigned to attributes in a color group.

12. The method of claim 1, wherein the evaluating is performed utilizing parallel processes with the evaluation block.

13. A system for evaluating attributes in a graphics processing unit having a plurality of processing stages, comprising:
- an evaluation block, configured to process a plurality of attributes corresponding to a plurality of pixels, wherein each of the plurality of pixels includes a portion of the plurality of attributes;
- a plurality of FIFO buffers, each configured between one of the plurality of processing stages and the evaluation block;
- a shared buffer, configured to store the plurality of attributes during attribute processing; and
- processing priority logic, configured to determine a plurality of priorities corresponding to the plurality of attributes.

14. The system of claim 13, wherein the plurality of attributes comprise attribute setup data.

15. The system of claim 13, wherein the plurality of attributes are divided into a plurality of groups, corresponding to the plurality of processing stages.

16. The system of claim 15, wherein one of the plurality of groups comprises a position group, configured to include attributes that determine pixel location.

17. The system of claim 16, wherein the position group comprises attributes selected from the group consisting of: a pixel X position, a pixel Y position, a pixel Z position, a pixel W position, and a pixel stencil value.

18. The system of claim 16, wherein one of the plurality of groups comprises a texture group, configured to include attributes that determine pixel texture mapping data.

19. The system of claim 18, wherein one of the plurality of groups comprises a color group, configured to include attributes that are utilized to perform color operations within a pixel shader.

20. The system of claim 19, wherein the processing priority logic assigns attributes in the position group as a higher priority than attributes in the texture group.

21. The system of claim 20, wherein the processing priority logic assigns attributes in the texture group a higher priority that attributes in the color group.

22. The system of claim 13, wherein the evaluating block comprises arbitration logic, configured to determine a processing order for a plurality of evaluation requests generated by the plurality of processing stages.

23. The system of claim 13, wherein the evaluation block comprises a plurality of evaluation circuits, configured to perform parallel processing.

24. The system of claim 13, wherein the shared buffer further comprises a plurality of address pointers configured to advance the attributes through the plurality of processing stages.

25. A system for evaluating attributes in a graphics processing unit, comprising:
- triangle attribute setup logic, configured to determine triangle data in a graphics pipeline;
- attribute setup logic, configured to determine a plurality of attributes corresponding to the triangle data;
- central buffering logic, configured to store the plurality of attributes during processing;
- calculation logic, configured to evaluate attributes from each of a plurality of processing stages; and
- arbitration logic, configured to establish priorities for the calculation logic; and
- memory configured to store attributes between each of the plurality of processing stages and the calculation logic.

26. The system of claim 25, further comprising a grouping means for dividing the plurality of attributes into a plurality of groups corresponding to the plurality of processing stages.

27. The system of claim 25, wherein the memory comprises FIFO buffering logic to store the attributes between each of the plurality of processing stages and the calculation logic.

28. The system of claim 27, wherein the arbitration logic utilizes the FIFO buffering logic to establish a plurality of priorities for the calculation logic.

29. The system of claim 28, wherein the plurality of priorities determine which of a plurality of evaluation requests are performed first.

* * * * *